(12) United States Patent
Razavi

(10) Patent No.: US 8,178,634 B2
(45) Date of Patent: May 15, 2012

(54) POLYOLEFINS PREPARED FROM A METALLOCENE AND A NEW SINGLE SITE CATALYST COMPONENT IN A SINGLE REACTOR

(75) Inventor: Abbas Razavi, Mons (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 755 days.

(21) Appl. No.: 11/665,716

(22) PCT Filed: Oct. 20, 2005

(86) PCT No.: PCT/EP2005/055398
§ 371 (c)(1),
(2), (4) Date: Apr. 18, 2007

(87) PCT Pub. No.: WO2006/045738
PCT Pub. Date: May 4, 2006

(65) Prior Publication Data
US 2008/0108766 A1    May 8, 2008

(30) Foreign Application Priority Data
Oct. 21, 2004 (EP) .................................. 04105218

(51) Int. Cl.
C08F 4/70    (2006.01)
C08F 4/76    (2006.01)
C08F 4/64    (2006.01)
C08F 4/52    (2006.01)

(52) U.S. Cl. ........ 526/115; 526/116; 526/117; 526/114; 526/113; 526/941; 526/943; 526/160; 526/161; 526/170; 526/172; 526/169.1; 526/142; 526/136; 526/135

(58) Field of Classification Search .................. 526/113, 526/114, 115, 116, 117, 169.1, 142, 160
See application file for complete search history.

(56) References Cited

U.S. PATENT DOCUMENTS

| | | | | |
|---|---|---|---|---|
| 5,145,819 A * | 9/1992 | Winter et al. | ................. | 502/117 |
| 5,908,903 A * | 6/1999 | Rosch | ............................ | 526/153 |
| 6,262,196 B1 * | 7/2001 | Mecking | ....................... | 526/114 |
| 6,407,188 B1 * | 6/2002 | Guan et al. | .................... | 526/113 |
| 6,465,386 B1 * | 10/2002 | Maddox et al. | ............... | 502/155 |
| 6,555,631 B1 * | 4/2003 | Wang et al. | .................... | 526/113 |
| 6,608,140 B2 * | 8/2003 | Christie et al. | ................ | 525/191 |
| 6,620,896 B1 * | 9/2003 | Killian et al. | .................. | 526/114 |
| 6,657,026 B1 * | 12/2003 | Kimberley et al. | ........... | 526/161 |
| 6,686,306 B2 * | 2/2004 | Shih | .............................. | 502/113 |
| 7,202,190 B1 * | 4/2007 | Bohnen et al. | ................ | 502/152 |
| 7,208,559 B2 * | 4/2007 | Satoh et al. | ................ | 526/348.6 |

FOREIGN PATENT DOCUMENTS

| | | | |
|---|---|---|---|
| EP | 416 815 A2 * | 8/1990 | |
| EP | 1 403 288 A1 * | 3/2004 | |
| EP | 1 650 236 A1 * | 4/2006 | |
| WO | WO 98/38228 A | 9/1998 | |
| WO | WO 2004/029101 A | 4/2004 | |
| WO | WO 2004/060932 A1 * | 7/2004 | |
| WO | WO 2006/045739 A1 * | 5/2006 | |

OTHER PUBLICATIONS

Mecking S: "Reactor Blending with Early/:ate Transition Metal Catalyst Combinations in Ethylene Polymerization" Macromolecular: Rapid Communications, Wiley VCH, Winheim, DE, V.

* cited by examiner

Primary Examiner — Rip A. Lee

(57) ABSTRACT

The present invention discloses a catalyst system based on a metallocene catalyst component and a new single site catalyst component for the production in a single reactor of improved polyolefins having a bimodal molecular weight distribution.

8 Claims, 3 Drawing Sheets

POLYOLEFINS PREPARED FROM A METALLOCENE AND A NEW SINGLE SITE CATALYST COMPONENT IN A SINGLE REACTOR

The present invention relates to a process for the production of an olefin polymer, in particular a bimodal polymer of ethylene, using two different new single site catalyst components. It also relates to polymers produced by the process. The invention also relates to use of a catalyst to form polymers of the present invention. The catalyst is advantageous, since it facilitates performance of the process in a single reactor, producing a multimodal product having a highly crystalline, low molecular weight component, and a further component having low density. The catalyst system of the present invention can be used in gas phase, slurry, multizone circulating reactors (MZCR) and solution processes In many applications in which polyolefins are employed, it is desirable that the polyolefin used has good mechanical properties. It is known that, in general, high molecular weight polyolefins have good melt strength and good mechanical properties. Additionally, since the polyolefin must usually undergo some form of processing, such as injection or blow moulding processes, and extrusion processes and the like, to form the final product, it is also desirable that the polyolefin used has easy processing properties. However, unlike the mechanical properties of the polyolefin, its processing properties tend to improve as its molecular weight decreases, particularly in the absence of any long chain branching.

Imparting potentially antagonistic properties such as easy processing and high melt strength, rigidity and toughness to high performance polyolefin resins has always posed serious challenges to scientists and engineers. It requires quite ingenious catalyst formulations and process-engineering design. Modern multi reactor, cascade process technologies employing state of the art catalysts have been used in an attempt to overcome the challenge. By judiciously controlling the conditions in each reactor, such as precise control of reactant concentrations, catalyst's residence time, and polymer block ratios, they enable sequential and in-situ production of polymer blends with intermingled chains of distinctly different lengths and compositions. In these so-called bimodal resins a compromise of counteracting properties may be reached.

Cascade reactor technologies comprise in majority two stirred tank slurry reactors, two slurry loop reactors or two gas phase reactors in series. Processes also exist wherein a combination of a loop and a fluidised bed gas phase reactor is employed. Reactor design, configuration, and conditions governing different cascade processes are quite different and may vary substantially from process to process. They all have however one distinct feature: they ensure, in one of the in series configured reactors, the production of a high density low molecular mass polymer component and in the other reactor, the production of a high molecular mass low density polymer fraction. Major challenges in all varieties of cascade technologies are:
1. Frictionless, unidirectional transfer of monomer, diluents and product from the first reactor to the second reactor, to avoid reactors cross contamination.
2. Perfectly synchronized catalysts life and residence times to ensure intimate polymer intermixing and homogenisation.

Additionally it is desired that the final bimodal exhibit well defined melt flow and density.

Each cascade technology has its own specificity.

The stirred tank slurry process employs gaseous monomer, ethylene with hexane as the preferred solvent as disclosed for example in Boehm (J. Appl. Polym. Sci., 22, 279, 1984). Along with catalysts and co-catalyst hydrogen is fed into the first reactor to reduce the molecular mass in the first stage and butene is introduced into the second reactor to lower the density. The stirred tank technologies have simplified reactor design and are easy to operate. The low monomer partial pressure and long residence times require, however, very high catalysts activities and life times.

In two slurry loop cascade processes, ethylene with a combination of butene/hexane or hexene/isobutane as co-monomer/solvent pair can be used. The reactors residence times are shorter and catalysts with moderate activities are tolerated. The major challenge in this type of processes is to prevent excess $H_2$ or co-monomer to enter into the next reactor.

A slurry loop reactor may be combined with a fluidised bed gas phase reactor as disclosed by Borealis. The first stage, loop reactor, insures rapid start up of the production. It uses propane in supercritical phase as diluent with the advantage of introducing a large quantity of hydrogen for the production of low molecular mass fraction without the risk of $H_2$ bubble formation and reactor pressure instability. Additionally, polymer dissolution and reactor fouling issues are eliminated due to low solubility in propane whose critical temperature remains below polymer's melting point. The second stage, the gas phase reactor provides good density regulation and excellent product flexibility.

Ziegler-Natta catalysts are predominantly used in cascade technologies. They fulfil conditions, such as moderate to high activities, good hydrogen response and co-monomer incorporation capability imposed by the cascade process. Their good thermal and chemical stability guarantees that they survive the relatively long overall residence times of the reactors. They produce however short polymer chains in the high molecular weight low-density fraction that remain in the amorphous phase, and do not contribute to tie molecules formation. Additionally, the branch rich, non-crystallisable low molecular weight material generally leads to de-mixing and phase separation and is not favourable to mechanical properties.

Single site catalysts in general and metallocenes in particular are ideally suited to be used in cascade technologies for the production of both fractions of bimodal polyethylene. Selected bridged metallocene catalysts with excellent hydrogen response and co-monomer incorporation capabilities allow the easier production of the bimodal polyethylene without excessive use of hydrogen and co-monomer, and therefore with little or no risk of the second reactor contamination. Their application is particularly advantageous since their narrow disperse polymers, permit precise design of the composition of each fraction particularly that of the low density, high molecular mass fraction. In metallocene based copolymer the branches are statistically distributed and are very effective in assisting tie molecule formation and preventing chains longitudinal diffusion and lateral slippage.

In cascade processes, polymer particle formation starts with catalyst particles being gradually fragmented by infused layers of high density and low-density polymer fractions in tandem reactors to finally become polymer particles. The solid-state morphology of the resulting polyethylene is that of a biphasic polymer alloy, in which the high-density, homopolymer component acts as the matrix for the low-density copolymer part as can be seen in FIG. 1. The high molecular mass copolymer chains traverse several crystalline and amorphous layers and interconnect adjacent crystalline lamellae as tie molecules. Tie molecules density is directly related to the chain length, molecular weight distribution (MWD), number and type of the side branches and the semi-crystalline morphology for a given lamellar thickness. They determine material's long- and short-term resistance to environmental and/or mechanical stress. In bimodal systems, the crystalline domain defines low strain rate of semi-crystalline polymers such as modulus, yield stress and slow crack growth properties whereas the amorphous region determines the high strain properties such as impact, tear and fracture resistance. The concentration of the tie molecules determines both the low and high strain rate behaviour. A high concentration of tie molecules can prevent or stop for example the brittle failure that is occasionally initiated, even at low stress, by a small crack and formation of a crazing zone. The crazing zone is formed by highly oriented fibrils under the applied stress concentration and is postulated to be due to disentanglement of tie molecules connecting the micro crystallites and fracture of the fibril. The resistance to fracture is thought to improve by incorporation of various types of branches the long branches being more effective. Branches are predominantly concentrated on tie-molecules that resist the chain pull out through the formation of micro-fibrils: they impede slow crack growth by reducing lamellar thickness and by decreasing the susceptibility to craze initiation and development. Branches also serve to pin-down tie molecules, which are a priori less mobile than their linear counterparts. The pinning of branches at the crystal fold surface and represented in FIG. 2 is thought to be responsible for the very high fracture toughness of low density polyethylene (LDPE). High fracture toughness is achieved in the longest branched chains that form tie-molecules. It is also equally important to optimise fracture toughness by regularly spacing the branches, as for example in low-density polyethylene produced with metallocene. The inter branch spacing sets the upper boundary to the effective molecular weight for tie-molecules.

The only disadvantage of using single site catalysts in cascade processes to produce bimodal polyolefin is the difficult homogenised extrusion due to very narrow molecular weight distribution of the two polymer fractions and to the lack of overlapping consisting of chains with intermediate molecular weight distribution. This is caused by non-ideal residence time distribution which is independent of the catalytic system in use, and cause some catalyst grains to leave the first reactor without any polymerisation and some catalyst grains to stay too long to be solely covered with a single fraction. The only remedy for this problem is the use of dual (or multiple) site catalysts in a single reactor. In this case each catalyst particle will have the compositional ratio of the low and high molecular weight fraction which was pre-designed by the composition of its individual active sites. The close proximity of the two fractions makes the homogeneous extrusion possible.

Production of polyolefin with a bimodal MWD in a single reactor has long been a goal of the polyolefin industry because single reactor configurations are significantly cheaper to build, have improved operability, and enable quicker product transitions than multi-reactor configurations. A single reactor can also be used to produce a broader range of products than can a set of cascaded reactors. Producing a resin having a bimodal MWD in a single reactor requires however highly sophisticated catalytic systems with at least two very different active site populations. It was thought that metallocenes, with their vast structural diversity, could provide highly chemoselective active site structures with distinctly different hydrogen and co-monomer response and thereby provide a facile route to dual site catalysts. The area of dual site single reactor systems has been the object of a lot of efforts by the present applicant such as disclosed for example in U.S. Pat. No. 6,255,428, EP-A-0790259, U.S. Pat. No. 6,410,476, WO/03029302, U.S. Pat. No. 6,380,311, U.S. Pat. No. 5,914,289, EP-A-830395, or U.S. Pat. No. 5,719,241. The method however still needs much improvement.

LIST OF FIGURES

Figure 1:
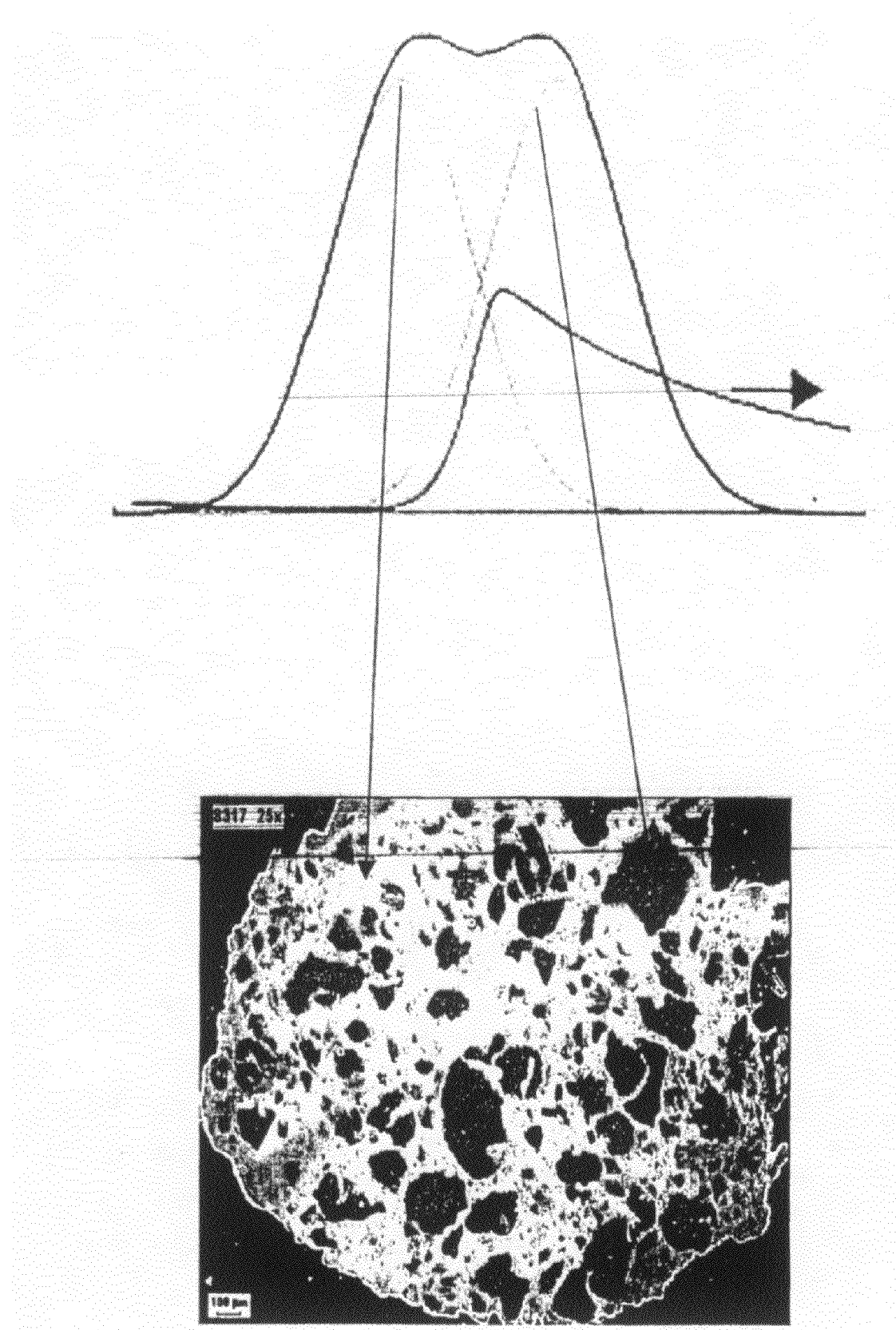
FIG. 1 represents the molecular weight distribution of a bimodal polyethylene resin and its relation to the dispersion of the low density fraction, represented by the dark areas, in the high density matrix, represented by the light areas.
Figure 2:
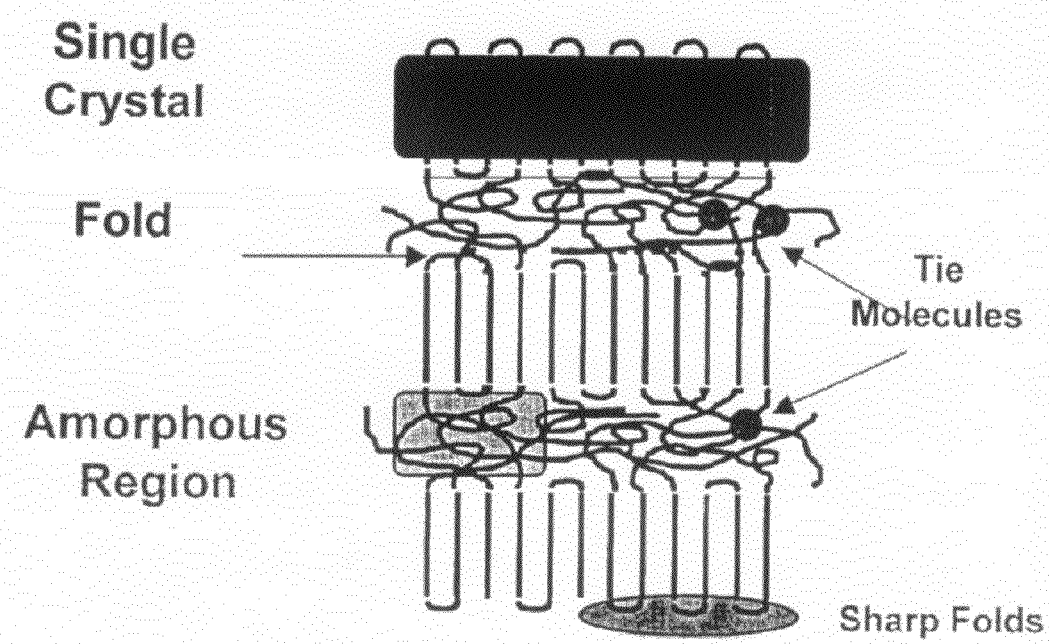
FIG. 2 is a schematic representation of semi-crystalline polyethylene.

Many applications still require improved polyolefins and there is still a need to control the molecular weight distribution of the polyolefin products more closely, so that the miscibility of the polyolefin components can be improved, and thus the mechanical and processing properties of the polyolefins. In particular it is desirable to improve the catalyst system employed in the manufacture of multimodal polyolefins, in order to achieve these improvements in the polymers themselves.

It is an object of the present invention to solve the problems associated with the above prior art by providing an improved catalyst system.

It is also an object of the present invention to provide an improved method for the formation of olefin polymers, employing new catalyst systems.

It is a further object of the present invention to develop a method that is capable of forming multimodal, particularly bimodal, olefin polymers, preferably in a single reactor.

Accordingly, the present invention provides a catalyst composition for the production of a multimodal olefin polymer, that comprises:

a) metallocene catalyst components of general formula (I):

$$R''(CpR_m)(C'pR'_n)MQ_2 \qquad (I)$$

wherein Cp is a substituted or unsubstituted cyclopentadienyl ring; C'p is a substituted or unsubstituted cyclopentadienyl ring R" is a structural bridge between Cp and C'p imparting stereorigidity to the component; each R or R' is the same or different and is selected from a hydrocarbyl group having from 1-20 carbon atoms, a halogen, an alkoxy group, an alkoxyalkyl group, an alkylamino group or an alkylsilylo group and two neighbouring substituents can be linked to form a cycle; M is a metal atom from Group 4 of the Periodic Table; and each Q is a hydrocarbon having from 1-20 carbon atoms or is a halogen
or of formula (I')

$$R''(CpR_m)XMQ_2 \qquad (I')$$

wherein R", Cp, M, Q and $R_m$ are as defined previously and X is an heteroatom, substituted or unsubstituted and selected from Group 15 or 16 of the periodic table, preferably, N, P or O b) and a single site catalyst component of formula (II):

$$(L)_n Me(Q')_p \qquad (II)$$

wherein L is an heteroatom-containing ligand; n is an integer of 1, 2, or 3; Me is selected from Ti, Zr, Sc, V, Cr, Fe, Co, Ni, Pd, or a lanthanide metal; each Q' is independently a hydrocarbon having 1-20 carbon atoms or a halogen; and p is the valence of Me minus the sum of the coordination numbers of all L.

An active catalyst system is prepared by adding an appropriate activating agent.

The catalyst system of the present invention is used in the homo- or co-polymerisation of alpha-olefins. The polymers obtained with the catalyst system of the present invention have a bimodal or multimodal molecular weight distribution. The molecular weight distribution is defined by the polydispersity index that is the ratio Mw/Mn of the weight average molecular weight Mw over the number average molecular weight Mn.

In a preferred embodiment according to the present invention, $(CpR_m)$ is a substituted or unsubstituted cyclopentadienyl and $(CpR'_n)$ is a substituted or unsubstituted fluorenyl.

In another more preferred embodiment according to the present invention, the metallocene component has Cs symmetry. More preferably, $(CpR_m)$ is an unsubstituted cyclopentadienyl and $(CpR'_n)$ is a fluorenyl substituted in positions 3 and 6. Preferably, the substituents on the fluorenyl are the same and they are tert-butyl.

In a further more preferred embodiment according to the present invention, the metallocene component(s) is (are) bridged bis-indenyl structure(s), preferably substituted in positions 2 and/or 4, or it is a bis-benzindenyl component and the cyclopentadienyl can be substituted at the distal and/or proximal positions.

Bis-cyclopentadienyl catalyst components can also be used.

The preferred metal M is hafnium.

In yet another preferred embodiment, the metallocene component is a constrained geometry zirconocene or titanocene, more preferably it is a constrained geometry titanocene.

The metallocene component is responsible for the high molecular weight component of the polyolefin, and hafnium is the preferred metal because it has excellent comonomer incorporation and inherently produces high molecular weight chains. The constrained geometry titanocene also produces high molecular weight chains.

Any activating agent having an ionising action known in the art may be used for activating the metallocene component. For example, it can be selected from aluminium-containing or boron-containing compounds. The aluminium-containing compounds comprise aluminoxane, alkyl aluminium and/or Lewis acid.

The aluminoxanes are well known and preferably comprise oligomeric linear and/or cyclic alkyl aluminoxanes represented by the formula:

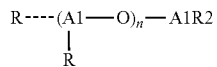   (III)

for oligomeric, linear aluminoxanes and

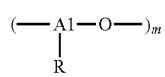   (IV)

for oligomeric, cyclic aluminoxane, wherein n is 1-40, preferably 10-20, m is 3-40, preferably 3-20 and R is a $C_1$-$C_8$ alkyl group and preferably methyl.

Suitable boron-containing activating agents that can be used comprise a triphenylcarbenium boronate such as tetrakis-pentafluorophenyl-borato-triphenylcarbenium as described in EP-A-0427696, or those of the general formula [L'-H]+[B $Ar_1$ $Ar_2$ $X_3X_4$]— as described in EP-A-0277004 (page 6, line 30 to page 7, line 7).

Aluminoxane activating agents are known to have a detrimental action when the metal used in the metallocene component is hafnium. It is believed that the presence of trimethylaluminium (TMA) in methylaluminoxane (MAO) is responsible for the low activity of the hafnium-based metallocene catalyst systems by producing a non-active bimetallic stable intermediate. TMA free modified MAO should be used (MMAO).

If a sterically hindered Lewis base is added to MAO, TMA can be trapped and thus be prevented from interacting with the cationic species. A sterically hindered organic Lewis base is an organic compound containing at least one atom having at least one free electron pair and in which this atom or these atoms has or have at least one directly adjacent group which largely shields it and which can cause steric hindrance. The most preferred sterically hindered Lewis base is a bulky phenol.

The aluminoxane and Lewis base are mixed together and left to react for a period of time of from 30 minutes to 2 hours, preferably about one hour in order to reach equilibrium.

Alternatively an activating agent based on borate can be used when metal M is hafnium.

In a preferred embodiment according to the present invention, metal Me in the single site component $(L)_n Me(Q')_p$ is preferably Fe.

The preferred single site component according to the present invention is a compound of formula V

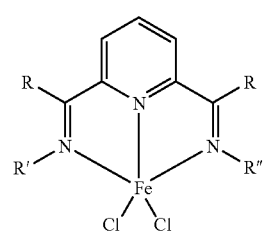   (V)

wherein R are the same and are alkyl groups having from 1 to 20 carbon atoms, preferably 1 to 6 carbon atoms and more preferably methyl groups, R' and R" are the same or different and are alkyl groups having from 1 à 20 carbon atoms substituted or unsubstituted or aryl groups having from 1 to 20 carbon atoms substituted or unsubstituted.

Preferably, R' and R" are the same or different and are selected from a substituted or unsubstituted alkyl having from 1 to 6 carbon atoms or are a unsubstituted or substituted aryl. The aryls group can themselves be substituted with alkyls having from 1 to 6 carbon atoms or with substituted or unsubstituted aryls having from 1 to 6 carbon atoms. More preferably, R' and R" are different and comprise substituted phenyls. Most preferably, R' is a phenyl substituted with methyls in positions 2 and 6 and R" is an any line substituted by two phenyls, each being substituted by a tert-butyl.

The steric environment of the iron-based complex(es) is determined by the substituents at positions 2 and 6 and optionally at positions 3, 4 and 5 on the phenyls.

For the steric effect, the preferred substituents on the phenyls, if present, can be selected from tert-butyl, isopropyl, methyl or phenyl. The most preferred substituents are methyls respectively at positions 2 and 6 for R' and phenyls respectively a positions 2 and 6 for R", each phenyl being substituted with a tert-butyl.

Preferably, the monomer used in the polymerisation reaction is ethylene.

When iron-based single site complex(es) are used in the copolymerisation of ethylene with a comonomer, it is observed that the comonomer is not incorporated in the backbone of the polymer chain. A highly crystalline ethylene polymer without branches is obtained. The molecular weight of the polymer is however reduced and it is believed that the comonomer acts as a chain transfer agent. The comonomer is an alpha-olefin having from 3 to 8 carbon atoms, preferably it is hexene and is used both for molecular weight regulation for high density polymer fraction and density regulation of the high molecular weight polymer fraction.

The combination of a hafnium-based metallocene catalyst component and of an iron-based new single site catalyst component is thus particularly beneficial in the production of bimodal polyethylene.

The hafnium-based component(s), responsible for the high molecular weight fraction of the polymer, is very efficient in comonomer incorporation and produces a low density high molecular weight component.

The iron-based single site component(s), responsible for the low molecular weight fraction of the polymer in the presence of a comonomer does not require the presence of hydrogen to terminate the chains.

The hafnium-based component can be replaced by a constrained geometry titanocene.

Increasing the comonomer concentration thus simultaneously reduces the density of the high molecular weight fraction and reduces the molecular weight of the low molecular weight fraction.

Instead of introducing the comonomer in the reaction zone, an oligomerisation catalyst system may be added for preparing the comonomer in situ. Oligomerisation catalysts systems are known by the man skilled in the art. Among the preferred oligomerisation catalyst system, one can cite for example the octanuclear nickel complex disclosed in international patent application PCT/EP2004/002145.

The invention also discloses a method for preparing a catalyst system that comprises the steps of:
a) providing first metallocene-based catalyst component(s) of formula I

$$R''(CpR_m)(C'pR'_n)MQ_2 \quad (I)$$

wherein Cp is a substituted or unsubstituted cyclopentadienyl ring; C'p is a substituted or unsubstituted cyclopentadienyl ring R" is a structural bridge between Cp and C'p imparting stereorigidity to the component; each R or R' is the same or different and is selected from a hydrocarbyl group having from 1-20 carbon atoms, a halogen, an alkoxy group, an alkoxyalkyl group, an alkylamino group or an alkylsilylo group and two neighbouring substituents can be linked to form a cycle; M is a metal atom from group 4 of the Periodic Table; and each Q is a hydrocarbon having from 1-20 carbon atoms or is a halogen or of formula (I')

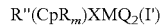

$$R''(CpR_m)XMQ_2 (I')$$

wherein R", Cp, M, Q and $R_m$ are as defined previously and X is an heteroatom, substituted or unsubstituted and selected from Group 15 or 16 of the periodic table, preferably, N, P or O b) and providing single site catalyst component(s) of formula (II):

$$(L)_n Me(Q')_p \quad (II)$$

wherein L is an heteroatom-containing ligand; n is an integer of 1, 2, or 3; Me is selected from Ti, Zr, Sc, V, Cr, Fe, Co, Ni, Pd, or a lanthanide metal; each Q' is independently a hydrocarbon having 1-20 carbon atoms or a halogen; and p is the valence of Me minus the sum of the coordination numbers of all L;
c) optionally providing an oligomerisation catalyst system;
d) providing an activating agent;
e) optionally providing a cocatalyst;
f) optionally providing a support;
g) retrieving an active catalyst system.

The catalyst components are preferably supported on the same or different supports.

The present invention also provides a process for producing a polyolefin having a multimodal molecular weight distribution, the process generally comprising the steps of:
(a) polymerising an olefin monomer and optional comonomer in the presence of a first catalyst, to form a first polyolefin component; and
(b) polymerising the same olefin monomer and optional comonomer in the presence of a second catalyst to form a second polyolefin component.

In the method of the invention, the molecular weight distribution of the first polyolefin component overlaps with the molecular weight distribution of the second polyolefin component, thus forming a polymer product that has at least a bimodal molecular weight distribution.

Thus, the present invention utilises at least two catalyst components (or two population of active sites) for producing at least two polymer components, each component forming part of the multimodal polymeric product. It is preferred that at least two catalyst systems are employed, and a bimodal or broad molecular weight distribution polymer product is produced. However, the invention is not limited to bimodal products only, and multimodal polymers may be produced if desired.

In a particularly preferred embodiment of the present method, the polymerising steps (a) and (b) take place in a single reaction zone, under polymerising conditions in which the catalysts producing the polymer components are simultaneously active.

Many known procedures for forming multimodal polyolefins have employed a different reactor for forming each component. The methods of the present invention are particularly advantageous, since they allow for the production of improved olefin polymers from a single reactor. This is because the catalysts employed in the present invention are more effective than known catalysts, particularly when utilised simultaneously in the same reactor. This has two distinct advantages. Firstly, since only a single reactor is required, production costs are reduced. Secondly, since the components are all formed simultaneously, they are much more homogeneously blended than when produced separately.

Although polymerisation in a single reactor is particularly preferred, the catalysts employed in the present invention are still particularly effective in producing the required polyolefin components of a multimodal product even when these components are produced in separate reactors. Accordingly, in some embodiments, separate reactors may be employed for forming some or all of the components, if desired.

Although the invention may be applied to any olefin polymerisation, the olefin monomer employed typically comprises ethylene and/or propylene. Bimodal or multimodal polyethylene is the most preferred product.

The catalyst systems employed in the present invention may be employed in any type of co-polymerisation method, provided that the required catalytic activity is not impaired. In a preferred embodiment of the present invention, the catalyst system is employed in a slurry process, which is heterogeneous. Preferred supports include a porous solid support such as talc, inorganic oxides and resinous support materials such as polyolefin. Preferably, the support material is an inorganic oxide in its finely divided form.

Suitable inorganic oxide materials are well known in the art. Preferably, the support is a silica support having a surface area of from 200-700 m$^2$/g and a pore volume of from 0.5-3 ml/g.

The amount of activating agent and metallocene usefully employed in the preparation of the solid support catalyst can vary over a wide range and depend upon the nature of the activating agent.

The order of addition of the catalyst components and activating agent to the support material can vary. In accordance with a preferred embodiment of the present invention activating agent dissolved in a suitable inert hydrocarbon solvent is added to the support material slurried in the same or other suitable hydrocarbon liquid and thereafter a mixture of the catalyst components is added to the slurry.

Preferred solvents include mineral oils and the various hydrocarbons which are liquid at reaction temperature and which do not react with the individual ingredients. Preferably, the support material is slurried in toluene and the catalyst components and activating agent are dissolved in toluene prior to addition to the support material.

The present invention also provides an olefin polymer, obtainable according to a method as defined above. The most preferred polymer obtainable according to the present invention is high density polyethylene (HDPE).

Also provided is the use of a dual catalyst system for producing an olefin polymer.

Resins having a bimodal molecular weight distribution can be used in high density, blown film, application where they offer an attractive combination of rheological properties in terms of shear response, low die swell, and high melt strength and of physico-mechanical properties such as clarity/low gel, tear strength, Environmental Stress Crack Resistance (ESCR). They further offer a good compromise of stiffness and impact resistance. These high-density polyethylene (HDPE) films are easy to process and allow down gauging and cost saving measures.

Blow moulding grades have excellent processing capabilities because of their low die swell and high melt strength. They also have good mechanical properties in terms of stiffness and ESCR. The containers prepared with the resins of the present invention can thus have thin walls, thereby requiring less material, and yet evince the resins having the best combination of top-load and ESCR.

Pressure pipe for natural gas and drinking water distribution, is another fast growing application for bimodal HDPE. The performance criteria for pressure pipes are processability during the extrusion through annular dies as well as short and long term performance properties requiring resistance to environmental (chemical and mechanical) stress ESCR, Slow Crack Growth (SCG), and Rapid Crack Propagation (RCP). They must compete with incumbent materials such as concrete and steel having long service lives of over 50 years.

Figure 3:
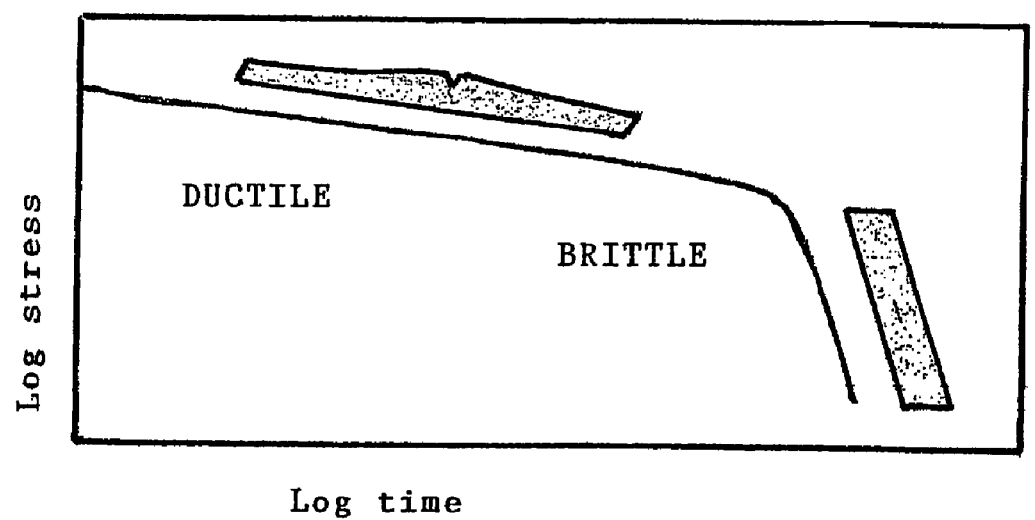
FIG. 3 represents the log/log curve of stress as a function of time for a bimodal polyethylene, showing the transition between ductile and brittle behaviours.

High performance pipes produced with the bimodal resin according to the present invention have the ability to resist short and long term failure mechanism such as growth of an incidental crack in the pipe over long periods of time under constant pressure (SCG), and resistance to RCP as a results of impact of a sharp object (impact failure). Additionally and most importantly, they exhibit high creep rupture strength (high modulus, high stiffness). The service lifetime is estimated via Long-Term Hydrostatic Strength (LTHS) that is determined by Minimum Required Stress (MRS) tests. These tests require a series of pressure/failure time curves established at different temperatures with a number of pipes having prescribed length, diameter and wall thickness. Calculations and extrapolations are then carried out following the method developed by Schulte (U. Schulte in 100 Jahre Lebensdauer; Kunststoffe, 87, p. 203, 1997.), and a Hooks stress/service time curve of well over 50 years at 20° C. is obtained. The curve, represented in FIG. 3, exhibits three distinct regions. After a short experiment time, a flat region in which at high stress the tested pipes failed in a ductile mode. After a very long experiment time, another region characterised by a very steep descent, during which the tested pipes, via a thermo-oxidative initiated change, failed in brittle mode. In between, there is a less pronounced intermediate region characterized by a ductile/brittle transition "knee". According to current results, metallocene based PE100 resin with ideal balance in fractional polymer properties has service life times of over a century. The classification PE100 is based on MRS at a temperature of 80° C., a pressure of 5 Mpa for a period of time of 1000 h according to the method of the ISO norm TR 9080.

The invention claimed is:

1. A method for polymerising olefins having a bi- or multi-modal molecular weight distribution comprising:
   a) injecting a catalyst composition into a reactor, wherein the catalyst composition comprises:
      1) at least one metallocene catalyst component of formula (I):

$$R''(CpR_m)(C'pR'_n)MQ_2 \quad (I)$$

wherein Cp is a cyclopentadienyl ring; C'p is a fluorenyl ring; R" is a structural bridge between Cp and C'p imparting stereorigidity to the component; each R or R' is the same or different and is selected from a hydrocarbyl group having from 1-20 carbon atoms, a halogen, an alkoxy group, an alkoxyalkyl group, an alkylamino group or an alkylsilyl group or two neighbouring substituents can be linked to form a cycle; M is a metal atom from group 4 of the Periodic Table; and each Q is a hydrocarbon having from 1-20 carbon atoms or is a halogen; m is an integer from 1 to 4 and n is an integer from 1 to 8 or
   of formula (I')

$$R''(IndR_q)_2MQ_2 \quad (I')$$

wherein R", M, Q and R are as described above, Ind is an indenyl group and q is an integer from 1 to 6, or
   of formula (I")

$$R''(CpR_m)XMQ_2 \quad (I'')$$

wherein R", Cp, M, Q, R and m are as defined previously and X is an heteroatom, substituted or unsubstituted selected from P or O;
   2) a single site polymerisation catalyst component of formula (II):

$$(L)_nMe(Q')_p \quad (II)$$

wherein L is an heteroatom-containing ligand; n is an integer of 1, 2, or 3; Me is Fe; each Q' is independently a hydrocarbon having 1-20 carbon atoms or a halogen; and p is the valence of Fe minus the sum of the coordination numbers of all L, wherein the metal is hafnium in the metallocene catalyst components of formula I or I';
   b) injecting monomer and comonomer into the reactor in the presence of the catalyst composition;
   c) adding an activating agent comprising methylaluminoxane combined with a sterically hindered Lewis base to the reactor wherein for Formulas (I) and (I'), the methylaluminoxane is MMAO; and
   d) maintaining polymerisation conditions thereby retrieving a polymer having a bi- or multi-modal molecular weight distribution.

2. The method of claim 1, wherein the metallocene component is of formula I and the fluorenyl ring is substituted in positions 3 and 6.

3. The method of claim 2, wherein the substituents on the fluorenyl are the same and are tert-butyl.

4. The method of claim 1, wherein the metallocene component is a bisindenyl and the indenyl is substituted at positions 2 and/or 4 and the cyclopentadienyl is optionally substituted at the distal and/or proximal positions relative to R".

5. The method of claim 1, wherein the single site catalyst component is represented by formula

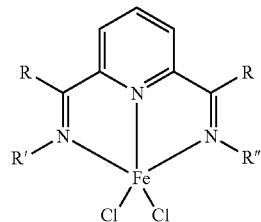

wherein R are the same and are alkyl groups having from 1 to 6 carbon atoms, R' and R" are different and comprise substituted phenyls.

6. The method of claim 1, wherein the sterically hindered Lewis base is a bulky phenol.

7. The method of claim 1 wherein the monomer is ethylene and the comonomer is present and is hexene.

8. The method of claim 1, wherein the comonomer is polymerized in the absence of hydrogen addition.

* * * * *